United States Patent [19]
Yamasaki et al.

[11] Patent Number: 5,319,640
[45] Date of Patent: Jun. 7, 1994

[54] TRANSMITTING/RECEIVING SYSTEM HAVING DIGITAL SWITCHING NETWORK

[75] Inventors: Hiroshi Yamasaki; Yuji Maeda; Shigehiko Yazawa, all of Kawasaki, Japan

[73] Assignee: Fujitsu Limited, Kawasaki, Japan

[21] Appl. No.: 16,578

[22] Filed: Feb. 10, 1993

Related U.S. Application Data

[63] Continuation of Ser. No. 661,842, Feb. 27, 1991, abandoned.

[30] Foreign Application Priority Data

Feb. 27, 1990 [JP] Japan .................. 2-044607

[51] Int. Cl.$^5$ .............................................. H04J 3/12
[52] U.S. Cl. ........................... 370/68.1; 370/110.1; 379/225; 379/229; 379/230
[58] Field of Search .............. 370/110.1, 79, 68.1; 379/201, 225, 229, 230

[56] References Cited

U.S. PATENT DOCUMENTS 4,757,526 7/1988 Foster et al. ................ 379/229 X
4,903,263 2/1990 Patel et al. ................... 370/110.1

FOREIGN PATENT DOCUMENTS

80484 10/1987 Australia ..................... H04M 11/06
1-164194 6/1989 Japan ........................... H04Q 3/58

Primary Examiner—Douglas W. Olms
Assistant Examiner—Russell W. Blum

[57] ABSTRACT

Transmitting/receiving system includes a plurality of analog junction lines and analog tie trunks provided at two ends of the analog junction lines. The PBX is provided with an analog junction line-ISDN converting unit. The analog junction line-ISDN converting unit is operative to transfer B-channel signals on a first analog junction line through the PBX network and the analog tie trunks and to transfer D-channel signals on a second analog junction line.

10 Claims, 6 Drawing Sheets

TRANSMITTING/RECEIVING SYSTEM HAVING DIGITAL SWITCHING NETWORK

This is a continuation of application Ser. No. 661,842, filed Feb. 27, 1991 abandoned.

BACKGROUND OF THE INVENTION

1. Field of the Invention

The present invention relates to a transmitting-/receiving system between private branch exchanges (PBX's) which includes a plurality of analog junction lines linked between one PBX provided with a plurality of integrated service digital network (ISDN) terminal equipment and another PBX provided with a plurality of ISDN terminal equipment and a plurality of analog tie trunks connected to the network constituting the one PBX and the network constituting the other PBX and connected to ends of the corresponding analog junction lines.

An ISDN is a digital integrated communications network with a wide range of services which uses digital lines. It is widely spreading in use. At the present, however, there are a few users which would like to use services of the ISDN other than its data communications service, i.e., just the telephone services of the ISDN. It is possible for users to make use of the abundant telephone services of an ISDN by using as is existing, cheap analog lines instead of introducing the higher cost digital lines.

2. Description of the Related Art

The spread of ISDN in recent years has been accompanied by the replacement of subscribers' terminal equipment with ISDN compatible terminal equipment. An increasing number of users would like to use just the telephone services among the various services available with an ISDN for the time being. In this case, the user cannot receive such ISDN telephone services just by replacing his digital terminal equipment with ISDN terminal equipment. That is, to receive such services, he must install some additional means.

Such additional means exist in concept, but none has yet actually been seen. If such an additional means were to be extremely high in price, there would be the problem that all significance would be lost in the users making use of existing analog line equipment.

SUMMARY OF THE INVENTION

Accordingly, an object of the present invention is to provide a transmitting/receiving system between PBX's in which the above-mentioned additional means is realized as an analog tie line-ISDN converting means and such an analog tie line-ISDN converting means is incorporated in the system.

To attain the above object, the present invention is constituted as follows: The PBX's are provided with analog tie line-ISDN converting means connected to their respective networks. Each of the analog tie line-ISDN converting means is operative so that, out of the B-channel signals and D-channel signals to be transferred with corresponding networks, the B-channel signals are sent and received through a first analog junction line and the D-channel signals are sent and received through a second analog junction line.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
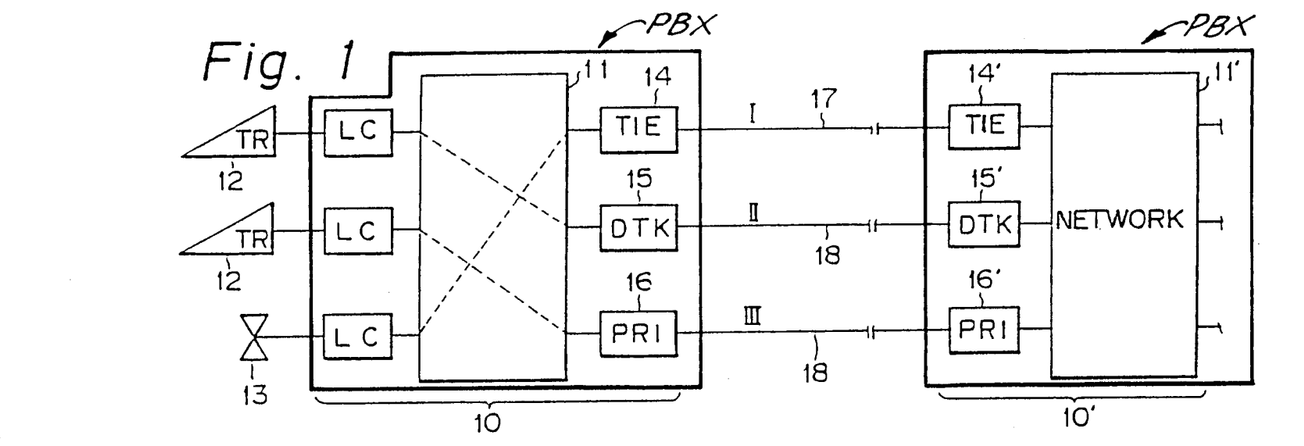
FIG. 1 is a view showing various general modes of connection in a transmitting/receiving system between PBX's.

FIG. 1 is a view showing various general modes of connection in a transmitting/receiving system between PBX's. In the figure, three types of connection modes are shown. These connection modes may be used alone or used combined, but for simplification all of the modes are drawn in the figure together. In the figure, 10 is an exchange (PBX), the heart of which is a network (digital-network) 11. Under the network 11 are provided ISDN terminal equipment (TR) 12 or non-ISDN compatible conventional digital terminal equipment 13 through the subscriber line circuits LC.

Three types of connection modes between the network 11 and the corresponding exchanges (PBX) 10' are shown in the figure: I, II, and III.

(i) Connection mode I is connection by an analog junction line 17 through the analog tie trunks (TIE) 14 and 14'.

(ii) Connection mode II is connection by a digital junction line 18 of 2.048 Mbps or 1.544 Mbps through digital trunks (DTK) 15 and 15'.

(iii) Connection mode III is connection by a digital junction line 118 through primary rate interface units (PRI) 16 and 16', which are inherently ISDN compatible interface units which can handle B-channel signals and D-channel signals.

As previously mentioned, the spread of ISDN in recent years has been accompanied by the replacement of subscribers' terminal equipment with ISDN compatible terminal equipment 12. An increasing number of users would like to use just the telephone services among the various services available with an ISDN for the time being. In this case, the user cannot receive such ISDN telephone services just by replacing his digital terminal equipment 13 with ISDN terminal equipment 12. That is, to receive such services, he must use the above-mentioned connection mode (iii) with the opposing exchange 11'. However, introduction of primary gate interface units (PRI) 16 and 16, and digital lines using a digital junction line 18 would be extremely expensive. There is a strong desire from users that, if possible, they be able to use as is existing facilities like the analog tie trunks (TIE) 14 and 14' and analog junction line 17.

Figure 2:
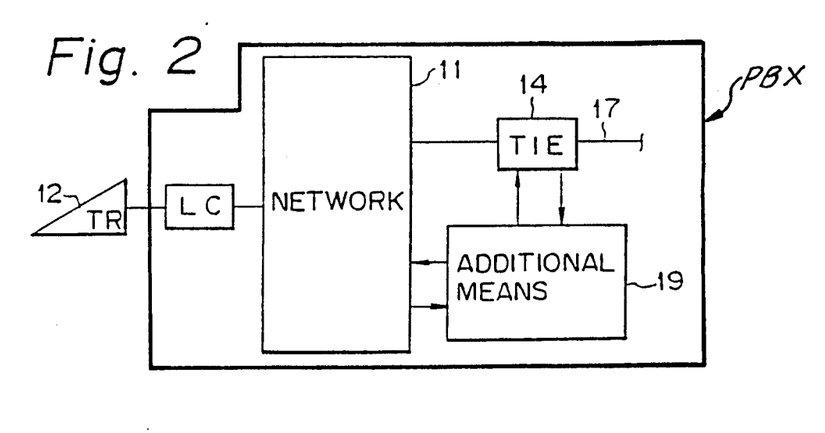
FIG. 2 is a view showing an additional means forming a presumption of the present invention.

FIG. 2 is a view showing an additional means forming a presumption of the present invention. As shown in the figure, to fulfill the above desire of the users, it may be easily considered to provide some additional means 19. However, while such additional means 19 exist in concept, hone has yet actually been seen. If such an additional means 19 were to be extremely high in price, there would be the abovementioned problem that all significance would be lost in the users making use of existing analog line equipment.

Figure 3:
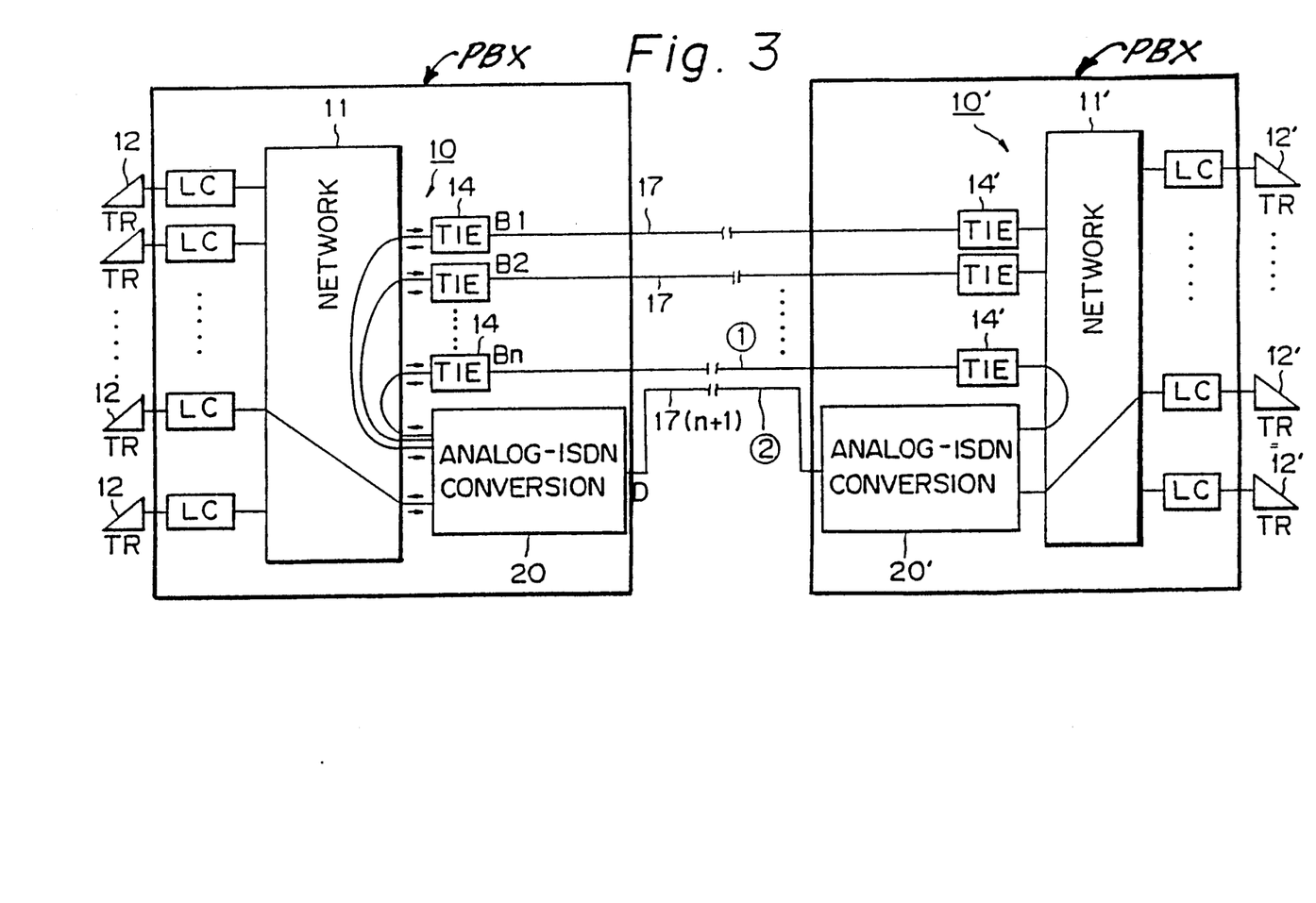
FIG. 3 is a view showing the principle of a transmitting/receiving system between PBX's based on the present invention.

FIG. 3 is a view showing the principle of a transmitting/receiving system between PBX's based on the present invention. The additional means 19 (FIG. 2) provided in the present invention is shown in this figure as the analog junction line-ISDN converting means 20. Further, the case is shown where n number of analog junction lines 17 are used and there are n number of analog lines. Further, another analog line is formed using the (n+1)-th analog junction line 17 (n+1) and serves as a fixed line for the D-channel signals. The ISDN communication frame is comprised of B-ch (channel)+D-ch, but in the case of the present invention, the signals B1, B2 ... Bn corresponding to the lines forming the B-ch are transferred along one of the routes, e.g., the first route ①. A signal D common to the lines forming the D-ch separated from the B-ch is transferred along the second route ②. Note that "n" in the figure is, for example, 23.

Figure 4:
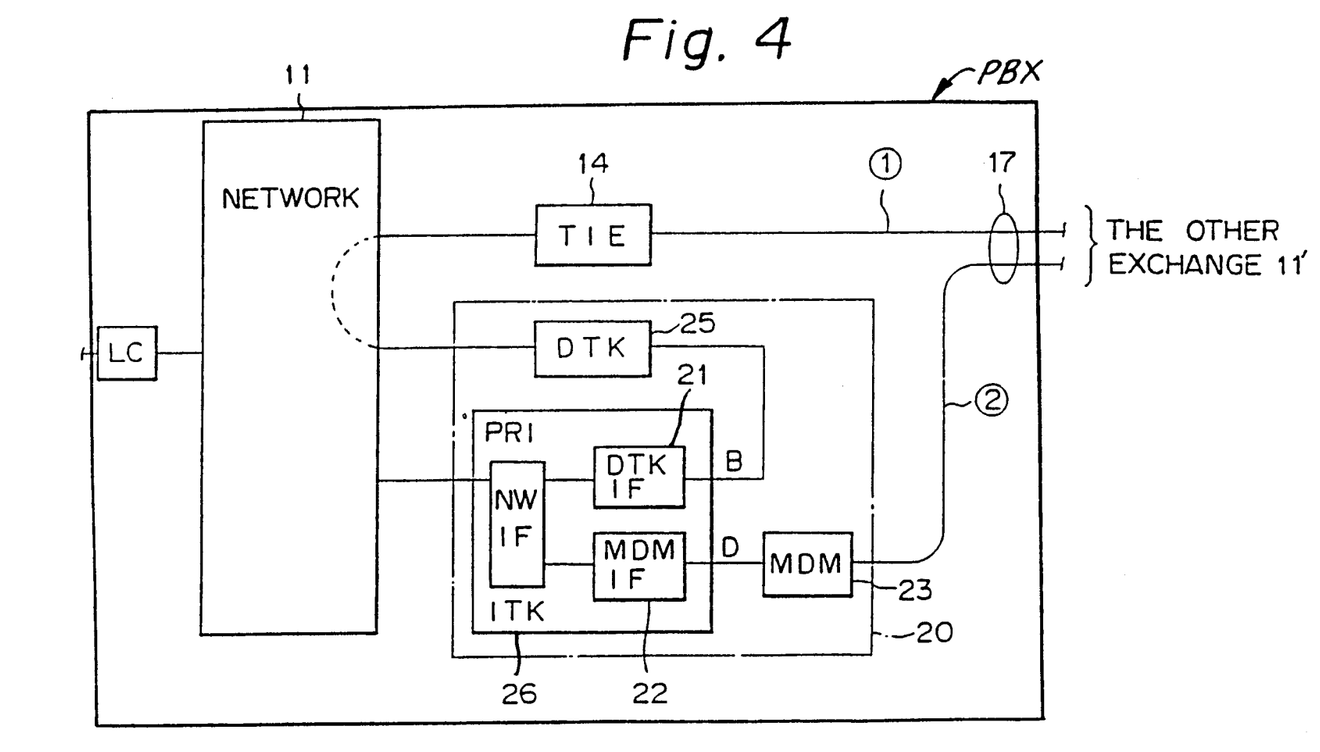
FIG. 4 is a view showing the constitution of an analog junction line-ISDN converting means forming the main part of the present invention.

FIG. 4 is a view showing the constitution of an analog junction line-LSDN converting means 20 forming the main part of the present invention. As shown in the figure, the analog junction line-ISDN converting means 20 includes an ISDN compatible ISDN tie trunk (ITK) 26, an internal B-channel digital trunk interface (DTK·IF) 21, a D-channel modem interface (MDM·IF) 22, and a modem (MDM) 23. Here, the modem 23 is connected to the second analog junction line 17 (②) and sends and receives D-channel signals (controls signals), while the digital trunk 25 sends and receives B-channel signals (voice signals) with the analog tie trunk 14 through the network 11, while the ISDN compatible ISDN tie trunk 26, as mentioned above, is comprised of a primary rate interface unit (PRI) housing the D-channel modem interface 22 corresponding to the modem 23 and the B-channel digital trunk interface 21 corresponding to the digital trunk 25 and sends and receives B-channel signals and D-channel signals with the network 11.

What should be noted-here is that the digital trunk 25 and ISDN compatible ISDN tie trunk 26 comprising the analog junction line-ISDN converting means 20 both may be easily available existing trunks, so the above-mentioned additional means 19 may be realized inexpensively, i.e., without high development costs. For example, the above-mentioned digital trunk 25 may be similar to the above-mentioned digital trunk 15, and the majority of the ISDN tie trunk 26 may be of the same constitution as the above-mentioned primary rate interface unit (PRI) 16 (network interface (NW·IF)) etc. Further, if necessary, a modem 23 may be provided, but the modem 23 may also be an existing one which is easily available inexpensively. Therefore, the only things that have to be newly designed are the interfaces 21 and 22.

The ISDN compatible ISDN tie trunk 26 has about the same function as a general primary rate interface unit (PRI), but the exchange 10 assumed in the present invention only has the analog tie trunk (TIE) 14 connected to the analog junction lines 17, so the ISDN B-channel signal (voice) input and output in the network 11 is passed through the digital trunk 25 and the network 11 and through the trunk 14. The digital trunk 25 is required because the ISDN tie trunk 26 (same as general primary rate interface unit (PRI)) and analog tie trunk 14 cannot be directly connected, and therefore the signal must first be reformed before transfer to match with a mode created inside the network 11. Thus, the digital trunk 25 is inserted.

Further, the ISDN D-channel signal (control signal) cannot be placed together on the voice use analog junction line 17, so is split off to another analog junction line 17 for transmission. This is similar to the thinking in the common signaling system of CCITT No. 7 recommendations.

Therefore, the above-mentioned additional means 19 may be realized just by using easily available existing equipment (DTK, PRI, MODEM).

Figure 5:
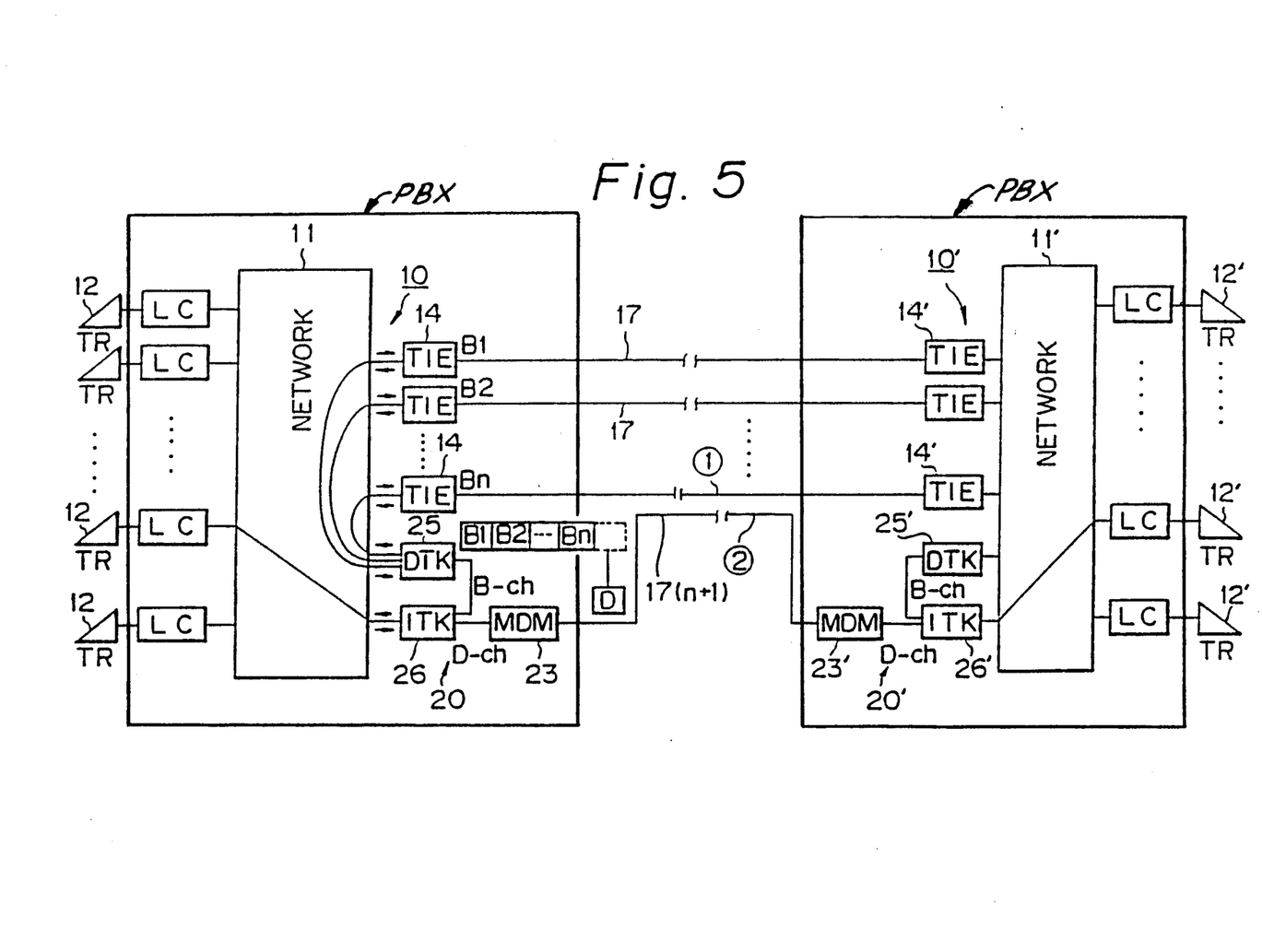
FIG. 5 is a view showing an example of the constitution of a transmitting/receiving system between PBX's based on the present invention.

FIG. 5 is a view showing an example of the constitution of a transmitting/receiving system between PBX's based on the present invention. In the system shown in the figure, the signals B1, B2 ... Bn corresponding to the lines forming the B-ch pass through the digital trunk 25, while the signals D common to the lines forming the D-ch separated from the B-ch pass through the modem (MDM) 23. However, the modem 23 is not an essential requirement.

One of the features of the present invention will be summarized below:

The analog junction line-ISDN converting means 20 and 20' include the ISDN tie trunks 26 and 26' and the digital trunks 25 and 25'.

The digital trunks are connected between the network and the ISDN tie trunk and control the transmission and reception of B-channel signals transferred on the first analog junction line through the corresponding analog tie trunks.

The ISDN tie trunk controls the transmission and reception of B-channel signals with the digital trunk and, on the other hand, controls the transmission and reception of D-channel signals transferred on the second analog junction line.

Figure 6:
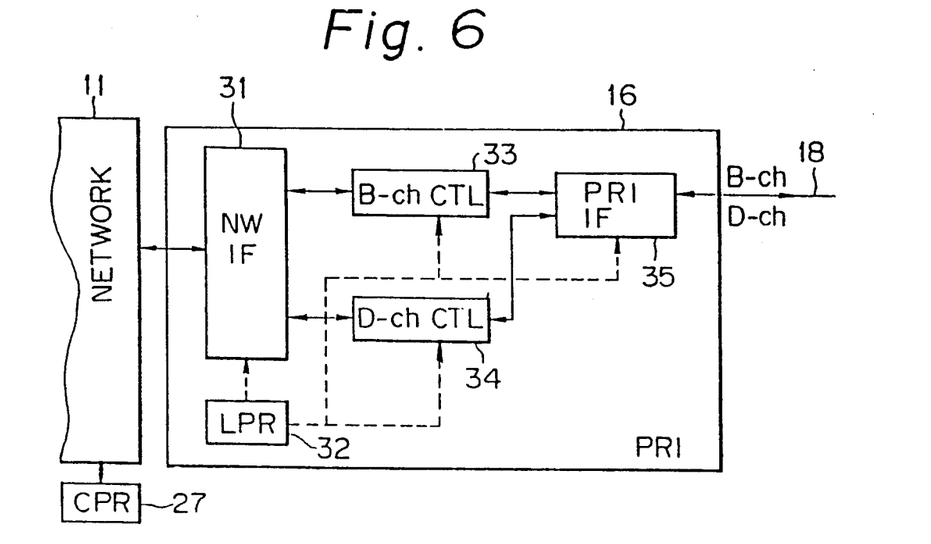
FIG. 6 is a view showing an example of the constitution of a general primary rate interface unit.

FIG. 6 is a view showing an example of the constitution of a general primary rate interface unit. This shows the above-mentioned primary rate interface unit (PRI) 16 (see FIG. 1). It is comprised inside of a network interface (NW·IF) 31, a line control processor (LPR 32), a B-channel controller (B-ch·CTL) 33, a D channel controller (D-ch·CTL) 34, and an interface (PRI·IF) 35 with the digital junction line 18. As mentioned earlier, the ISDN tie trunk (ITK) 26 in the analog junction line-ISDN converting means 20 in the present invention is comprised of the general primary rate interface unit 16 shown in FIG. 6 plus some design changes. This is clearly shown in FIG. 7. FIG. 8 is a view showing a specific example of the constitution of the ISDN tie trunk shown in FIG. 7. Note that elements the same as in FIG. 6 and FIG. 7 are given the same reference numerals or symbols.

Figure 7:
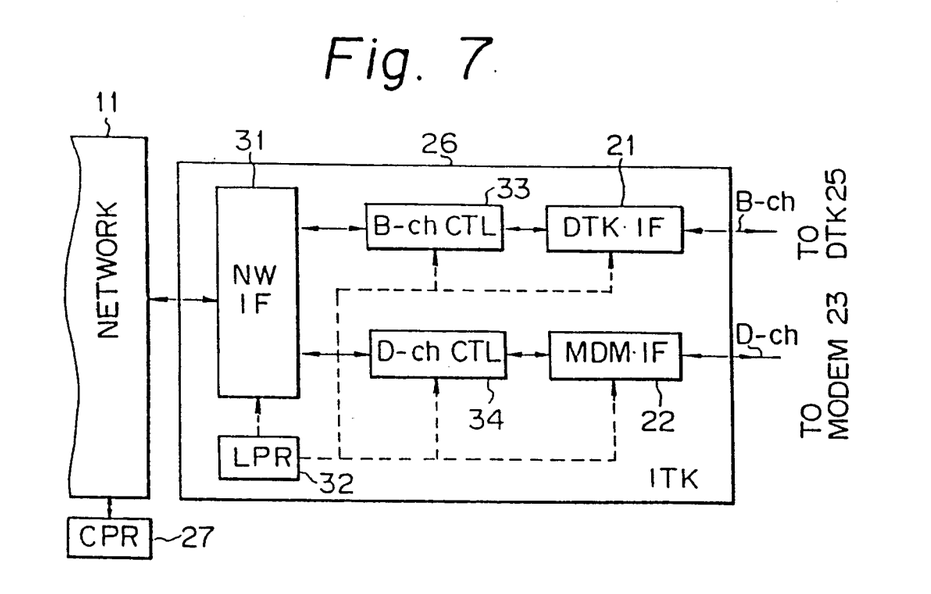
FIG. 7 is a view showing an example of the constitution of an ISDN tie trunk according to the present invention.
Figure 8:
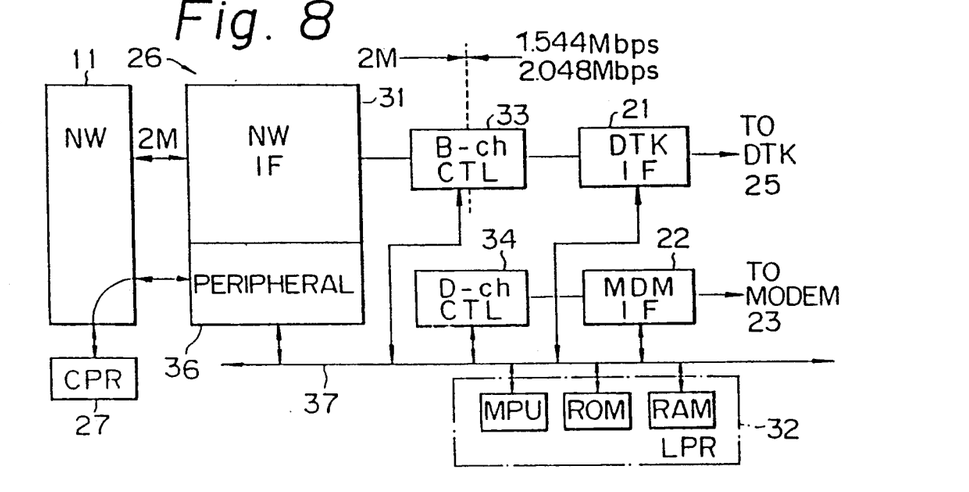
FIG. 8 is a view showing a specific example of the constitution of the ISDN tie trunk shown in FIG. 7.

As shown in FIG. 7, the analog junction line-ISDN converting means 20 (20') which forms the key part of the present invention includes the ISDN analog tie trunk (ITK) 26 (26'). The trunk 26 (26') is comprised of at least the network interface (NW·IF) 31 and the line control processor (LPR) 32 which transfers call control data through the network interface 31 with the call processor (CPR) 27 which controls the network 11 (11'). In actuality, it is actually comprised of primary rate interface unit (PRI).

Further, the ISDN tie trunk 26 (26') has a B-channel signal digital trunk interface (DTK·IF) 21 and D-channel signal modem interface (MDM·IF) 22 inserted between the network interface 31 and digital trunk 25 (25') and between the interface network 31 and modem 23 (23').

In the ISDN tie trunk 26 (26') are a B-channel controller (B-ch CTL) 33 inserted between the network interface 31 and digital trunk 25 (25') and a D-channel controller (D-ch CTL) 34 inserted between the network interface 31 and modem interface 22.

In FIG. 7, the line control processor (LPR) 32 performs control of the various portions in the ITK 26 as shown by the broken line arrow in the figure. The B-channel controller 33 performs the control of the B-channel signals (voice signals), and the D-channel controller 34 performs the processing of the D-channel signals (control signals), for example, control of the high level data link control procedure (HDLC).

The B-channel digital trunk interface 21 performs the signal conversion etc. necessary for connection to the digital trunk 25. The D-channel modem interface 22 performs the signal conversion, e.g., RS-232C, necessary for connection to the modem 23.

FIG. 8 is a view showing the example of the constitution of the ISDN tie trunk according to the present invention. The network interface 31 is provided with a line control processor (LPR) peripheral 36 connected to the D-channel controller 34. Further, the line control processor 32, D-channel controller 34, B-channel controller 33, digital trunk interface 35, and modem interface 22 are controlled all together through the common bus 37 under the line control processor 32. The LPR 32, as shown, is comprised of a microprocessor MPU and a read only memory ROM and random access memory RAM which cooperate with the MPU.

Figure 9:
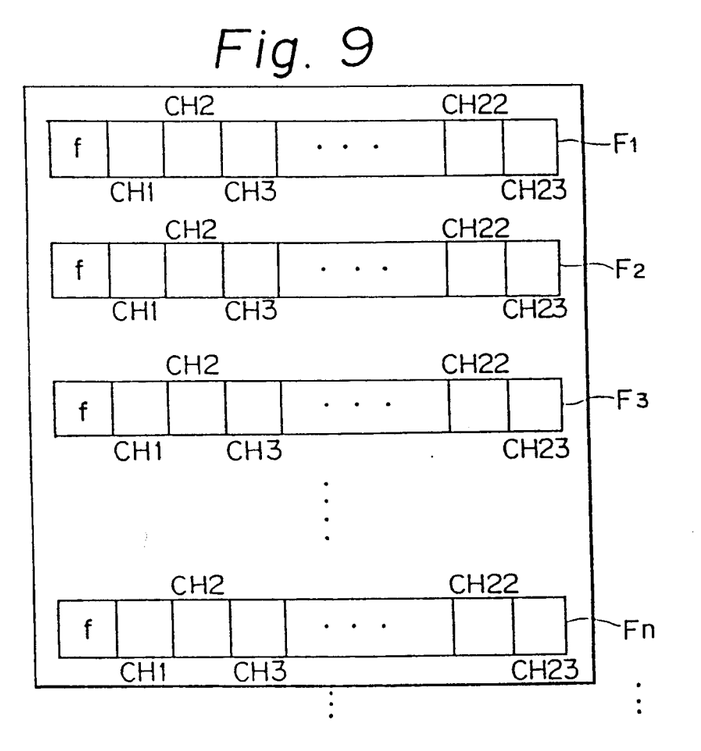
FIG. 9 is a view showing the general frame format composing an ISDN signal.

FIG. 9 is a view showing the general frame format composing an ISDN signal. The digital trunk interface 21 operates so as to disregard the time slot allocated for the D-channel among the time slots in each frame when processing a series of communication frames composing the ISDN signals sent and received between two communicating ISDN terminal equipment 12 and 12'. Regarding the frame format of the ISDN signals generally used, the series of communication frames F1, F2, F3 . . . Fn . . . serially sent and received are formatted as shown in FIG. 9. At the head of each communication frame is the frame synchronization bit f. The bits are selectively and successively monitored by the DTK·IF 21 to find the frame synchronization pattern. When the pattern is found, synchronization is performed with the ISDN signal. The DTK·IF 21 also serves to create such a frame format. Also, the DTK·IF 21 performs level conversion with the DTK 25, i.e., TTL (21)⇌G703 (CCITT) level (25).

In FIG. 9, the communication frames (F1, F2 . . . ) are usually composed of 23 channels, of which CH1 to CH22 are used as B-channel signals and CH23 is used as the D-channel. In the present invention, among the ISDN signals passing through the DTK·IF 21, the D-channel signal is unnecessary (see FIG. 5). Therefore, the DTK·IF 21 operates so as to disregard every time slot for the D-channel (not limited to CH23) in the communication frames.

The time slot for the D-channel is useful only for the D-ch CTL 34. The CTL 34 becomes active each time the time slot arrives. The HDLC transmission data is generated and the HDLC reception data is terminated at the CTL 34.

The B-channel controller (B-ch CTL) 33 of FIG. 8 is comprised of an elastic buffer memory, such as a RAM, which buffers the difference between the signal processing speed in the PBX 10 (10') and the signal transmission speed on the analog junction line 17. The signal processing speed is usually 2 Mbps, while the signal transmission speed is usually 1.5 Mbps (North America) or 2.044 Mbps (Europe).

As explained above, according to the present invention, it is possible to receive the abundant telephone services of an ISDN using the existing analog junction lines by just providing an inexpensive additional means to the network.

We claim:

1. A transmitting/receiving system having a digital switching network connected to a plurality of analog junction lines, the system comprising:

a plurality of analog tie trunks connected to the digital switching network and the analog junction lines;

analog tie line ISDN converting means including means for separating a B channel signal and a D channel signal of an ISDN signal given from said digital switching network from each other, first means for transmitting the separated D channel signal through a first analog junction line, means for interfacing the separated B channel signal with the digital switching network, and second means for transmitting the separated B channel interface with the digital switching network through a second analog junction line; and control means for controlling said digital switching network to connect a corresponding analog tie trunk to said interfacing means so as to transmit the separated B channel signal through said second analog junction line.

2. Transmitting/receiving system as set forth in claim 1, wherein said analog tie line ISDN converting means includes an ISDN tie trunk and a digital trunk, said digital trunk being connected between said network and said ISDN tie trunk and controlling transmission and reception of said B-channel signal transferred on said second analog junction line through a corresponding analog tie trunk, said ISDN tie trunk controlling the transmission and reception of said B-channel signal with said digital trunk and also controlling the transmission and reception of said D-channel signal transferred on said first analog junction line.

3. Transmitting/receiving system as set forth in claim 2, wherein said separating means of said converting means includes a primary rate interface unit including a network interface and a line control processor which transfers call control data through said network interface with a call processor controlling said network.

4. Transmitting/receiving system as set forth in claim 3, wherein said analog tie line ISDN converting means further includes a modem, said modem being connected to said ISDN tie trunk and controlling the transmission and reception of said D-channel signal transferred on said first analog junction line.

5. Transmitting/receiving system as set forth in claim 4, wherein said ISDN tie trunk includes a B-channel signal digital trunk interface and a D-channel modem interface, inserted between said network interface and said modem, respectively.

6. Transmitting/receiving system as set forth in claim 5, wherein said ISDN tie trunk includes a B-channel controller inserted between said network interface and said digital trunk and a D-channel controller inserted between said network interface and said modem interface.

7. Transmitting/receiving system as set forth in 6, wherein the system has a peripheral for the line control processor which is provided in said network interface and which is connected with said D-channel controller and wherein the line control processor, the D-channel controller, the B-channel controller, the digital trunk interface, and the modem interface are controlled all together through a common bus under said line control processor.

8. Transmitting/receiving system as set forth in claim 7, wherein said digital trunk interface operates so as to disregard each time slot allocated for a D-channel among time slots in communication frames when processing a series of communication frames composing an ISDN signal sent and received between two mutually communicating ISDN terminal equipments.

9. Transmitting/receiving system as set forth in claim 6, wherein said D-channel controller generates HDLC transmission data and terminates HDLC reception data.

10. Transmitting/receiving system as set forth in claim 6, wherein said B-channel controller is comprised of an elastic buffer memory which buffers a difference between a signal processing speed in a PBX and a signal transmission speed on the analog junction line.

* * * * *